United States Patent [19]

Legge et al.

[11] Patent Number: 5,063,094
[45] Date of Patent: Nov. 5, 1991

[54] DRAPED PARISON BLOW MOLDED BOX

[75] Inventors: Richard C. Legge, Pittsford; George F. Arp, Fairport, both of N.Y.

[73] Assignee: John D. Brush & Co., Inc., Rochester, N.Y.

[21] Appl. No.: 547,283

[22] Filed: Jul. 3, 1990

Related U.S. Application Data

[62] Division of Ser. No. 335,576, Apr. 10, 1989, Pat. No. 4,948,357, which is a division of Ser. No. 868,294, May 28, 1986, Pat. No. 4,828,786.

[51] Int. Cl.$^5$ ............................................. B65D 1/40
[52] U.S. Cl. .................................. 428/35.7; 220/469; 220/675
[58] Field of Search ............... 428/35.7; 220/425, 466, 220/469, 627, 675

[56] References Cited

U.S. PATENT DOCUMENTS

| | | | |
|---|---|---|---|
| 3,275,726 | 9/1966 | Rudolph | 264/98 |
| 3,334,164 | 8/1967 | Samuels et al. | 264/90 |
| 3,372,429 | 3/1968 | Kato | 18/5 |
| 3,437,423 | 4/1969 | Mondiadis | 220/469 |
| 3,441,071 | 4/1969 | Schurman et al. | 220/469 |
| 3,452,125 | 6/1969 | Schurman et al. | 264/89 |
| 3,579,622 | 5/1971 | Shaw et al. | 264/99 |
| 3,636,151 | 1/1972 | Nagai | 264/89 |
| 3,736,201 | 5/1973 | Teraoka | 156/145 |
| 3,746,204 | 7/1973 | Nagai | 220/469 |
| 3,806,587 | 4/1974 | Turner | 425/387 B |
| 3,861,845 | 1/1975 | Butcher | 425/302 B |
| 3,865,531 | 2/1975 | Moore et al. | 425/387 B |
| 3,944,643 | 3/1976 | Sato et al. | 264/97 |
| 4,029,234 | 6/1977 | Johnson, Jr. et al. | 264/98 |
| 4,035,461 | 7/1977 | Korth | 264/89 |
| 4,423,000 | 12/1983 | Teraoka | 264/524 |
| 4,510,116 | 4/1985 | Peters et al. | 264/529 |
| 4,550,008 | 10/1985 | Shimizu | 264/527 |
| 4,584,158 | 4/1986 | Nilsson et al. | 264/529 |
| 4,770,839 | 9/1988 | Legge | 264/526 |
| 4,805,290 | 2/1989 | Brush, Jr. et al. | 264/523 |
| 4,828,786 | 5/1989 | Legge et al. | 264/526 |
| 4,846,662 | 7/1989 | Leege | 425/522 |
| 4,898,707 | 2/1990 | Arp | 264/536 |
| 4,919,880 | 4/1990 | Arp | 264/536 |

FOREIGN PATENT DOCUMENTS

58-203022 11/1983 Japan .
911228 11/1962 United Kingdom .

Primary Examiner—James J. Seidleck
Attorney, Agent, or Firm—Eugene Stephens & Associates

[57] ABSTRACT

A dobule-walled plastic box 20 is molded from a single parison 50 in an unlimited depth by closing the bottom of parison 50 and draping it downwardly over a core 60 so that a leading part of the parison forms an inside wall of the box and a following part of the parison forms an outside wall of the box. After parison 50 is draped over core 60, outer mold parts 61 close around the core and the draped parison; and the box is blown in a cavity between the core and the outer mold parts. The parison can be ballooned while draping down over the core to enlarge the parison to stand out from and surround the core, which can be raised during the draping process. Parison 50 can also be deballooned after draping to stay within the confines of outer mold parts 61 while core 60 raises and while the outer mold parts close.

6 Claims, 8 Drawing Sheets

DRAPED PARISON BLOW MOLDED BOX

RELATED APPLICATIONS

This application is a division of allowed parent application Ser. No. 335,576, filed Apr. 10, 1989, entitled DRAPED PARISON BLOW MOLDING APPARATUS, now U.S. Pat. No. 4,948,357, which parent application is a division of grandparent application Ser. No. 868,294, filed May 28, 1986, entitled DRAPED PARISON BLOW MOLDING, now U.S. Pat. No. 4,828,786, issued May 9, 1989.

BACKGROUND

The most efficient way of molding double-walled boxes has been to blow mold them from a single parison formed laterally into a molding space between a cavity and core. This limits the depth of such boxes to one-half their width. Greater depths for blow molded double-walled boxes have long been sought, and the need for this has produced several suggestions. Nagai U.S. Pat. No. 3,636,151 suggests two parisons arranged side by side and blown into box halves joined together along a seam line; and U.S. Patent Applications Ser. Nos. 827,865 (abandoned) and 828,243, assigned to the assignee of this application, suggest a way of blow molding deep, double-walled boxes in two parts that are later joined together. In both of these solutions, the production measures relating to the seam lines add to the expense of the boxes.

I have discovered a way that a deep, double-walled box can be blow molded from a single parison that is closed and draped downward over a core so that a leading portion, ext to the core, becomes an inside wall of the box; and a succeeding portion, surrounding the core, becomes an outside wall of the box. Outer mold parts then close around the parison draped over the core, and the parison is blown in the cavity between the core and the outer mold parts to form a double-walled box that is unlimited in depth.

My invention seeks economical, effective, and reliable blow molding of double-walled boxes that are unlimited in depth and are blown in a single piece from a single parison. Our way of accomplishing this includes molding methods and equipment and results in a uniquely formed, double-walled box. Although my way of making deep, double-walled boxes was to satisfy a need for blow molded boxes having interwall spaces that can be filled with a concrete type of fire resistant insulation material, my invention is not limited to such uses and can be applied to deep, double-walled boxes made for other purposes, such as thermally insulated ice chests, for example. Also, although this application refers to the blown product as a "box", it need not have a box shape or be rectangular in cross section; and it can have a circular, elliptical, or other cross section for a shape that might not ordinarily be called a "box". Regardless of the shape, however, the blown product is double walled, relatively deep from its bottom to its open end, and formed of a single parison draped over a core.

SUMMARY OF THE INVENTION

My way of blow molding a single parison into a deep, double-walled box includes: closing a lower region of the parison; lowering the closed parison over a core for the box so that a leading region of the parison drapes down over the core and a trailing region of the parison stands off from the core; closing outer mold parts together around the core and the parison draped over the core so that the outer mold parts can form an outer wall of the box while the core forms an inner wall of the box; and blowing the parison between the core and the outer mold parts. As the closed parison drapes over the core, it can be ballooned by air from a blow pin so that the ballooned parison surrounds and stands off from the core. The core can be raised as the parison drapes down over it, and the core can be lowered for removing the blown box from the mold. My improvements in blow molding equipment can accomplish all these functions and produce a deep, double-walled box having a leading parison pinch-off region formed on an inside wall of the box in the deepest part of the box, from which resin material extends along the inside wall of the box to the open side of the box and thence along the outside wall of the box to a following pinch-off region spaced opposite to and nearby the leading pinch-off region.

DETAILED DESCRIPTION

Figure 1:
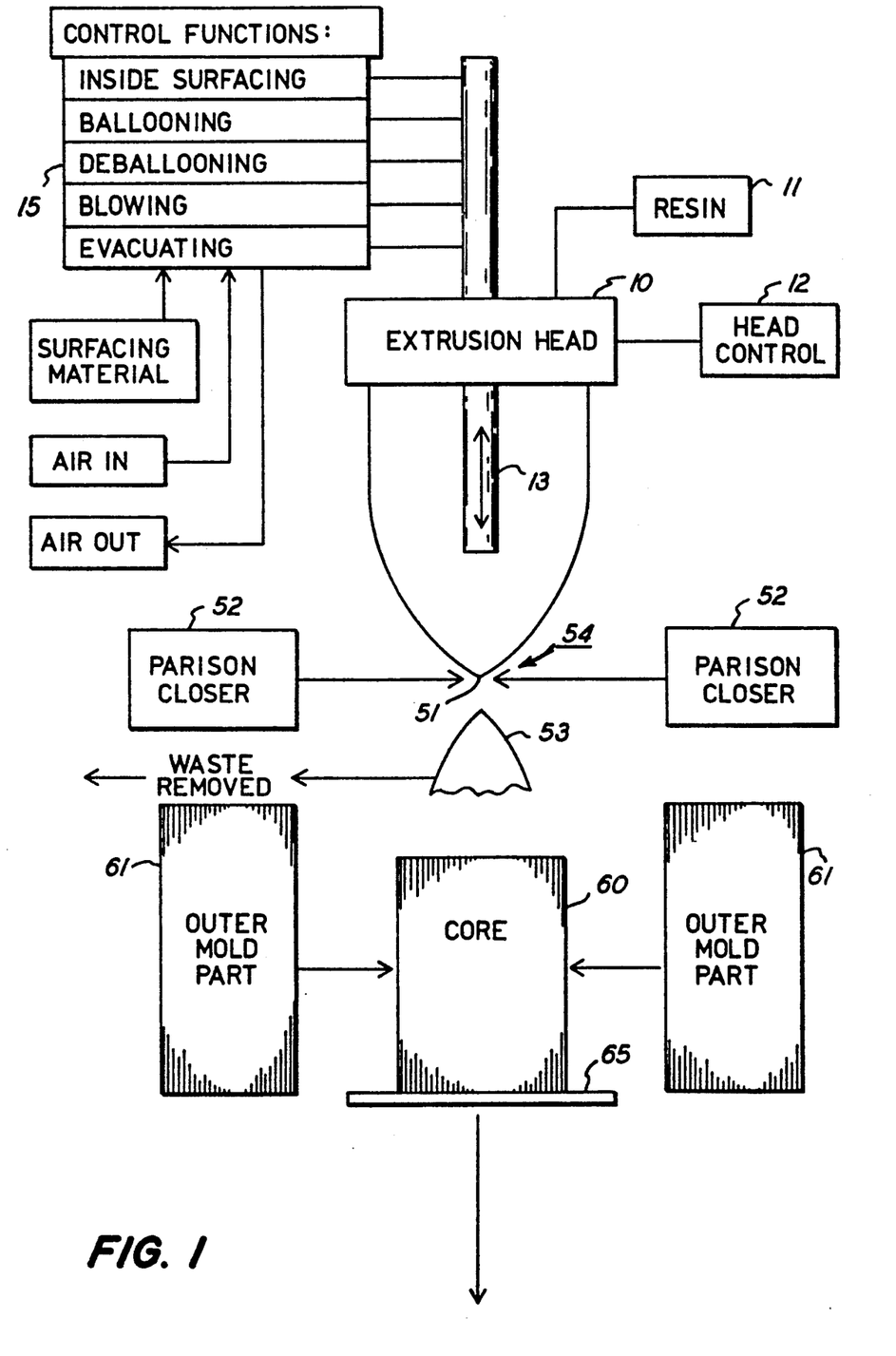
FIGS. 1–6 are schematic views showing successive steps preferably used in my blow molding equipment and methods for forming a deep, double-walled box.

A machine for blow molding deep, double-walled boxes according to my invention preferably includes some special functions that are shown in FIG. 1 and not repeated in the other figures. The extrusion head 10 is fed with plasticized resin from a source 11 that can include an accumulator (not shown), and a head control 12 regulates the lowering of a parison 50 from extrusion head 10. Blow pin 13, arranged within parison 50, is preferably movable vertically relative to head 10. Also provided, preferably via blow pin 13, are control functions 15, involving air movement in and out of parison 50, and coating the inside surface of parison 50 with a material that prevents it from sticking to itself. These control functions include: delivering the surface material at the proper time for coating a region of the inside surface of parison 50 that might contact itself; delivering air to the interior of the closed parison for ballooning it to a large enough size to surround core 60 during draping; deballooning parison 50 by evacuating some of its interior air to reduce the ballooned size of the parison; blowing the parison between core 60 and outer mold parts 61 for shaping the parison to the mold cavity; and evacuating air from the blown box to facilitate its separation from mold parts.

Figure 2:
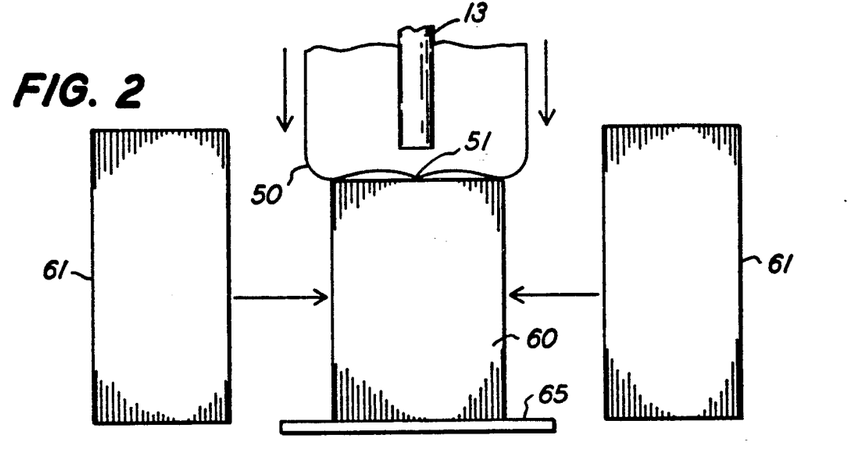

In the blow molding sequence illustrated in FIGS. 1–6, a lower region 54 of parison 50 is closed by sticking or fusing the parison wall to itself with a pair of opposed parison closers 52. These can have various forms, including opposed bars that press toward each other to flatten parison 50 and stick the parison wall to itself, forming a closed seam or pinch-off 51. Parison closers 52 can also cut away and remove a waste portion 53 from below pinch-off 51; and by folding or compressing the parison wall, the parison closers can shorten the length of pinch-off seam 51 if necessary. Once the lower region 54 of parison 50 is closed, it lowers onto the top of core 60, as shown in FIG. 2, where it will form the bottom of the inside wall of the deepest part of the box.

Figure 3:
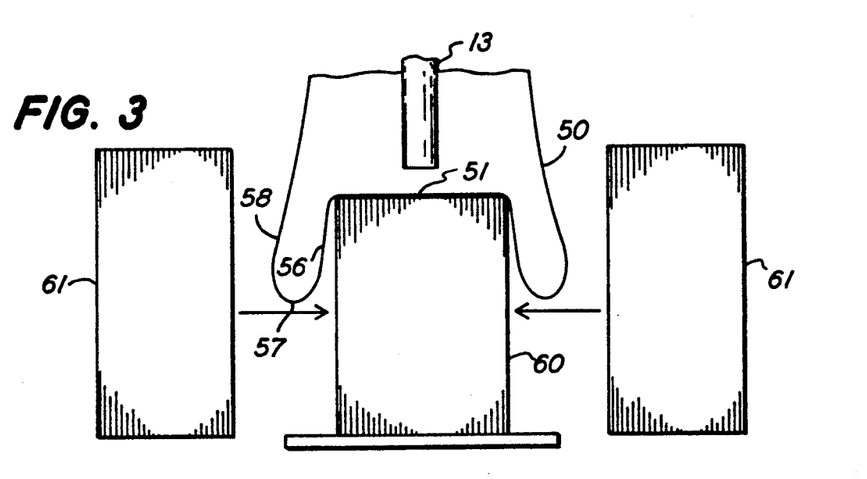
Figure 4:
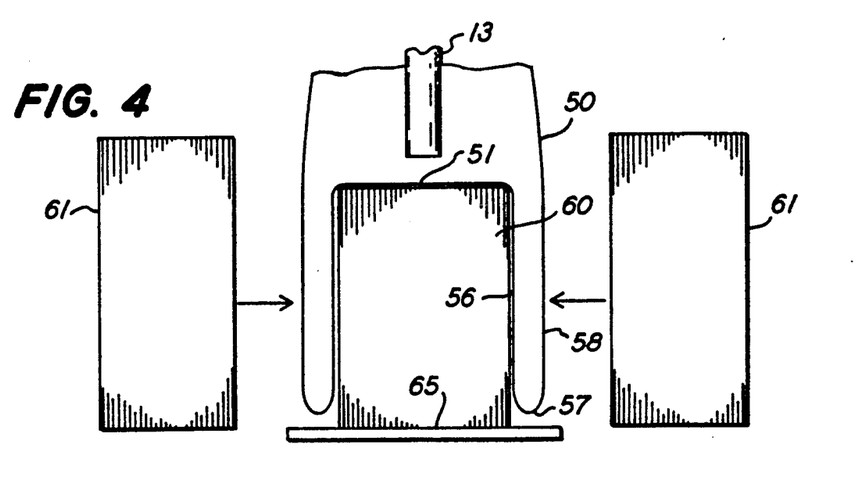

As parison 50 lowers further, it begins draping over the sides of core 60 as shown in FIGS. 3 and 4. To do this, parison 50 is preferably larger than core 60 so that a leading region 56 of parison 50 drapes over the top of core 60 and down the sides of core 60 to an advancing inversion region 57 leading into a succeeding region 58 that surrounds and stands off from core 60 and leading region 56. When fully draped, as shown in FIG. 4, the inversion region 57 is adjacent a flange 65 on core 60 where it will form an open end of the molded box.

Figure 5:
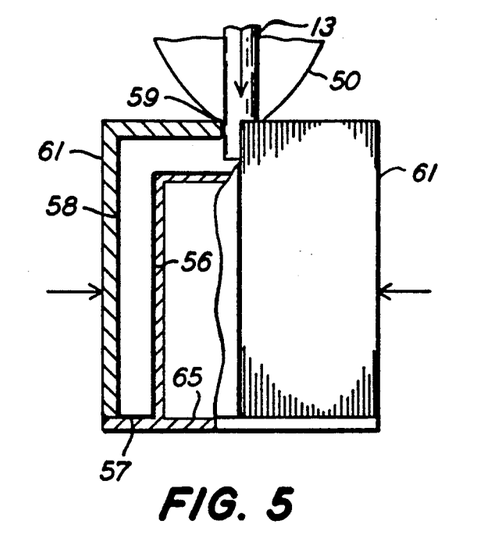
Figure 6:
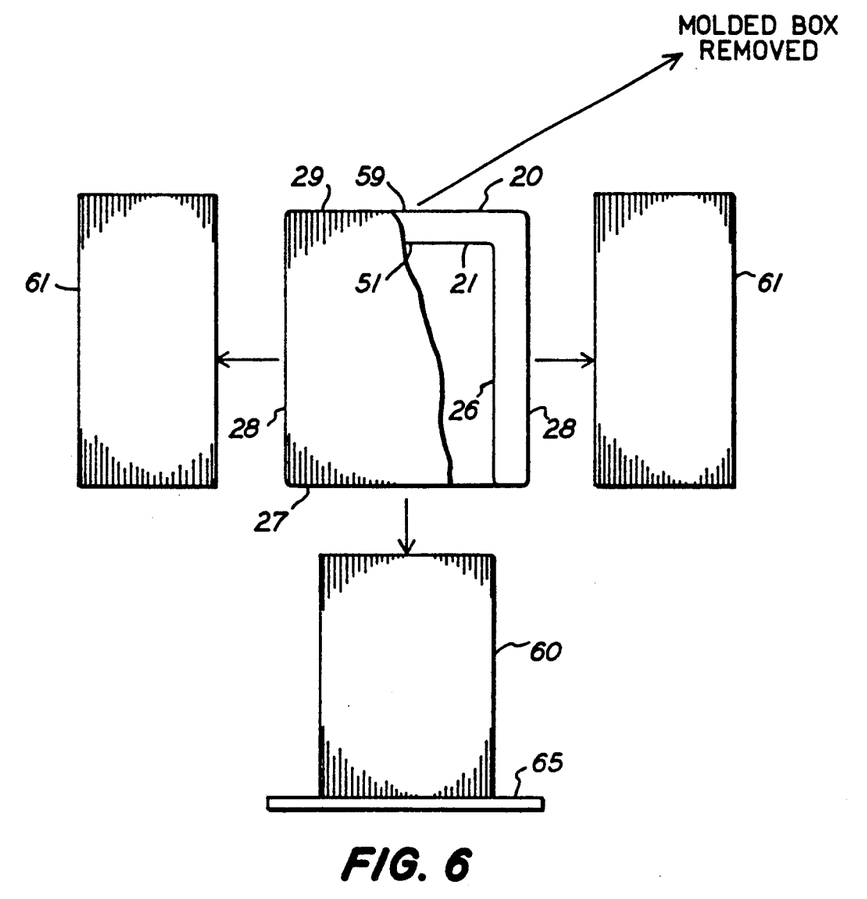

Then the outer mold parts 61 close together around draped parison 50 and core 60, as shown in FIG. 5, to enclose the draped parison within a cavity between core 60 and outer mold parts 61. The closure of outer mold parts 61 pinches off a trailing or following portion 59 of parison 50 at the outside of the bottom wall of the box to be blown, in the region of blow pin 13. Blowing air then blows the draped parison into a deep, double-walled box shaped to conform to the cavity between core 60 and outer mold parts 61. After the blow resin has set, outer mold parts 61 are opened up and the blow box 20 is removed from the machine. This can be facilitated by evacuating air through blow pin 13 to flex the box walls slightly inward and ease their release from mold surfaces. Also, box 20 can be removed by lifting it upward from core 60, either with core 60 remaining in place or with core 60 lowered relative to outer mold parts 61 as suggested in FIG. 6. High pressure air can be supplied to the top of core 60 to blow upward against box 20 and help loosen in from core 60 for removal from the molding machine. The molded box 20, beginning with leading pinch-off 51 on inside bottom wall 21 at the deepest part of the box, has an inside wall 26, a wall 27 around the open end of the box, an outside wall 28 spaced from inside wall 26, and an outside bottom wall 29, spaced from inside bottom wall 21 and terminating at trailing pinch-off 59.

My invention includes many variations on the relatively simple embodiment illustrated in FIGS. 1-6, and some of these possibilities are shown in FIGS. 7-12. All the capabilities and controls explained relative to FIG. 1 are preferably included, but not illustrated, for the sequence illustrated in FIGS. 7-12. The differences in the sequence of FIGS. 7-12 involve holding the closed parison at the top of core 60 while the parison is draped, and ballooning the parison to enlarge its diameter during draping.

Figure 7:
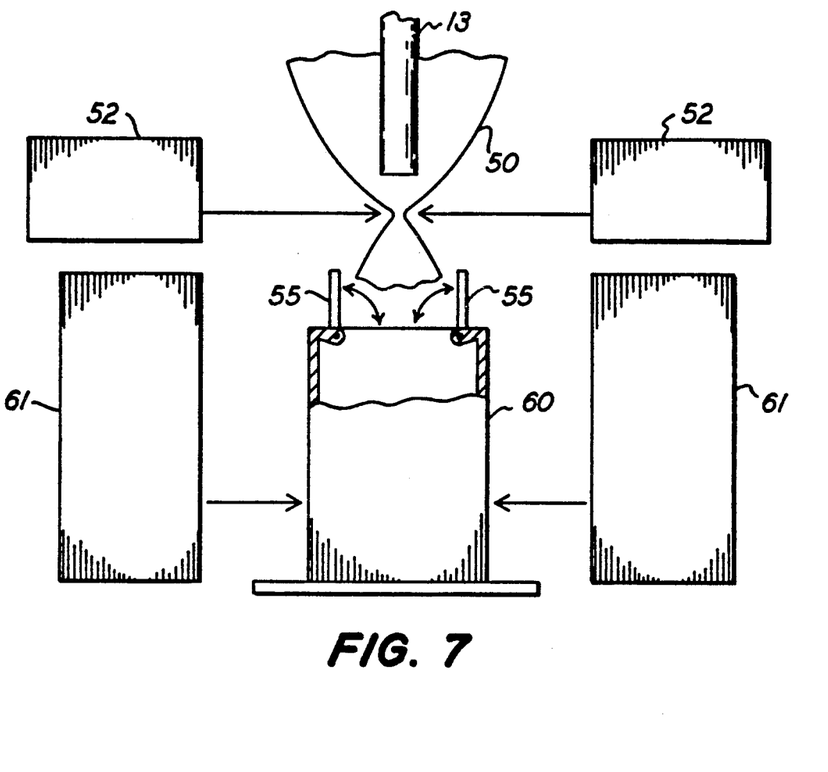
FIGS. 7–12 are schematic views, similar to the views of FIGS. 1–6, showing portions of alternative preferred molding methods and equipment for forming deep, double-walled boxes.
Figure 8:
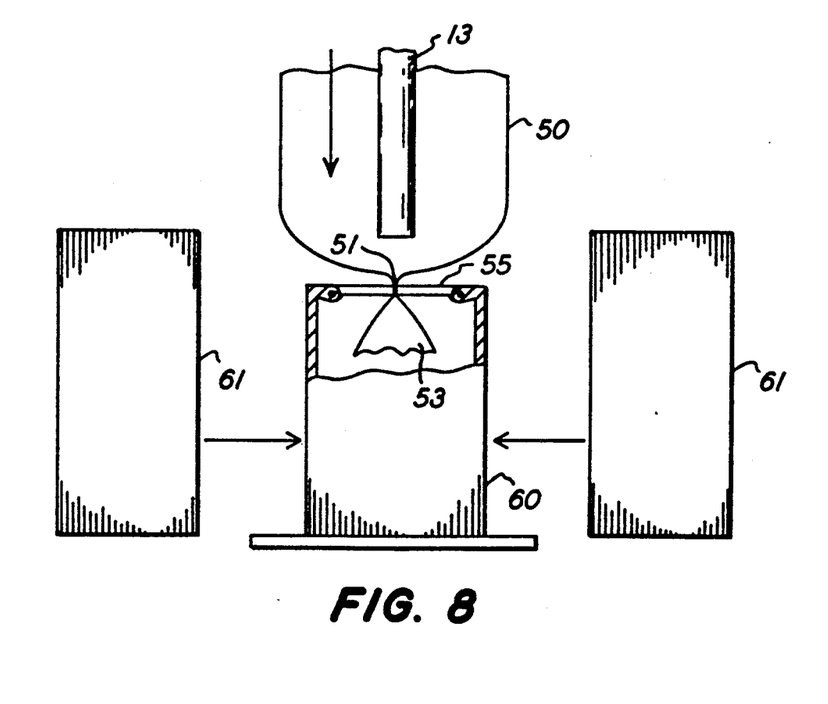

The holding of the closed parison is accomplished by clamp jaws 55 that are open and separated in FIG. 7 and pivoted together in FIG. 8 to pinch off and hold parison 50, a lower region of which extends below the top of core 60 into a hollow interior of core 60. Clamps 55 are preferably shaped to form part of the top of core 60 when closed as shown in FIG. 8, and they are preferably hinged and driven between open and closed positions. Parison closers 52 can also be used to draw together and reduce the dimension of a lower region of parison 50 so that it fits readily between open clamp jaws 55. A downward air blast from blow pin 13 through the open bottom of parison 50 can also accomplish this without assistance from parison closers 52. Closing of clamp jaws 55, as shown in FIG. 8, not only closes parison 50 at pinch-off region 51, but also holds parison 50 in place during draping. Waste resin 53 from the closed end of parison 50 hangs within hollow core 60 and is removed, either during the molding process or after the blown box leaves the molding machine.

Figure 9:
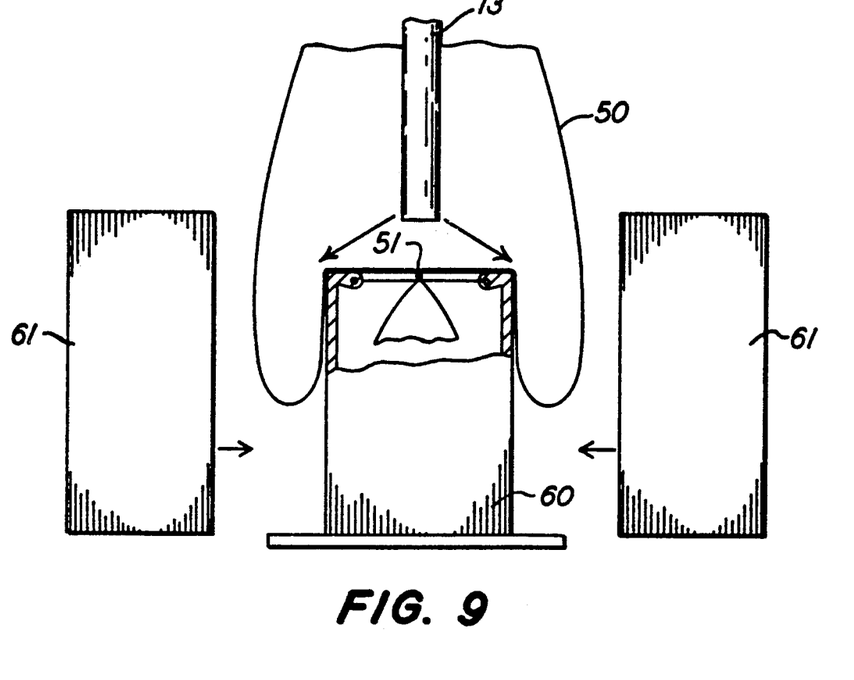
Figure 10:
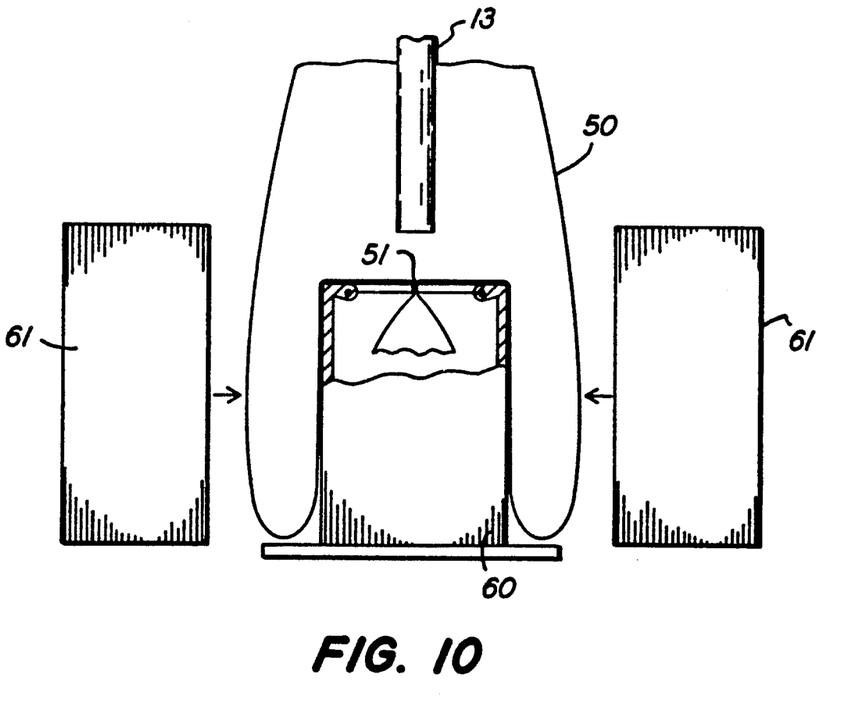
Figure 11:
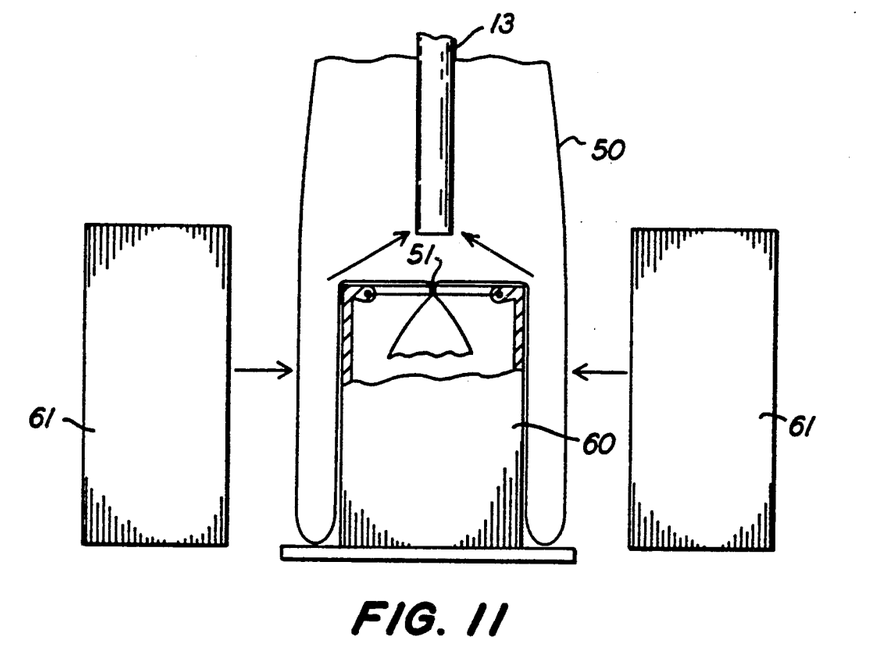

In the sequence of FIGS. 7-12, parison 50 is not initially large enough to surround core 60, but is ballooned to a larger size as shown in FIGS. 9 and 10 as it drapes down over core 60. During this process, the inside surface of ballooned parison 50 is preferably coated with a material that prevents that surface from sticking to itself on contact. Materials that succeed at this include oily, slippery materials such as vegetable oils and small particles such as powered inorganic material. A likely place for contact to occur between the inside walls of parison 50 is at the upper corners of core 60 as shown in FIG. 11.

Figure 12:
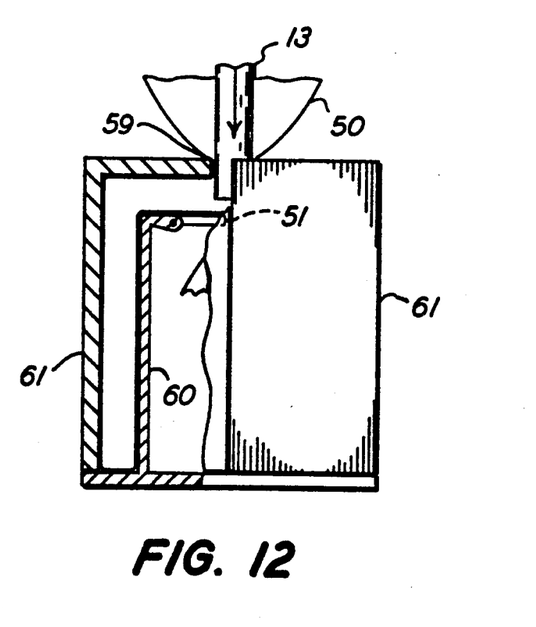

Ballooned parison 50 can reach a larger size than the cavity space available within outer mold parts 61, and this can result in pinching off portions of the outer parison wall as outer mold parts 61 close. One way to avoid this is to enlarge the number of outer mold parts—from two to four, for example—so that outer mold parts move inward in four directions upon the ballooned parison. Another possibility, that we prefer, is to deballoon the parison, as shown in FIG. 11, by evacuating some of its internal air outward through blow pin 13 before closing outer mold parts 61. This shrinks parison 50 back down to a size that fits within outer mold parts 61. As these close around the deballooned parison, they pinch off a trailing parison region 59 at the outer wall of the box opposite the leading pinch-off region 51 on the inner wall of the box, as shown in FIG. 12. Then, the box is blown, the mold parts are opened, and the box is removed from the mold and trimmed of any waste material, such as pinch-off waste 53. These operations are similar to those previously described and schematically illustrated in FIG. 6.

Figure 13:
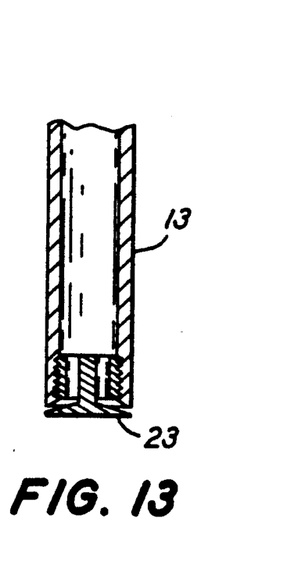
FIG. 13 is a partially schematic, fragmentary view of a blow pin for use in the blow molding methods and equipment of FIGS. 1–12.

The lower end of blow pin 13 can be provided with a diverter 23, as shown in FIG. 13, for diverting downwardly flowing fluid laterally outward to direct non-stick coating material against the inside surface of parison 50. There are other ways of depositing material on the inside surface of the parison, and coating material need not necessarily be directed against the parison wall from the blow pin.

Figure 14:
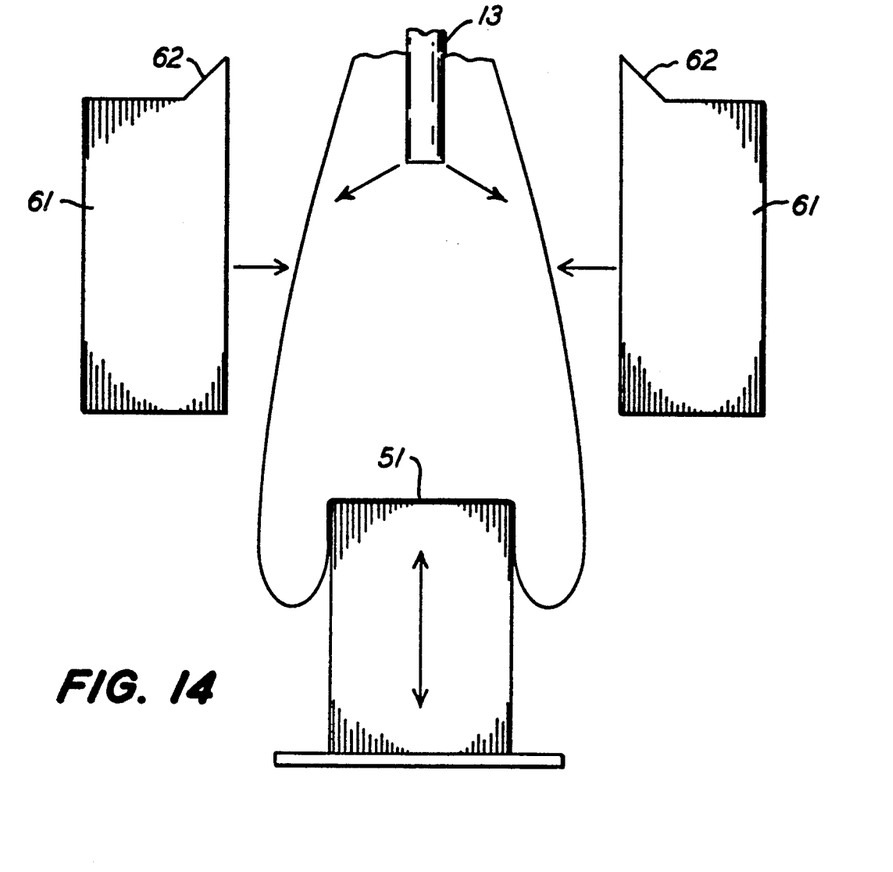
FIGS. 14—17 are schematic views of successive steps of another preferred variation of my blow molding methods and equipment for forming deep, double-walled boxes.
Figure 15:
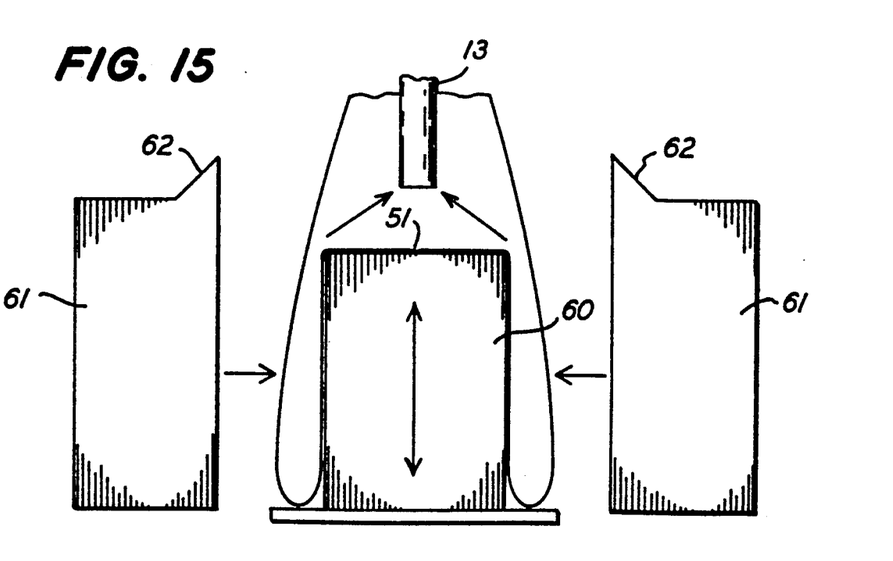
Figure 16:
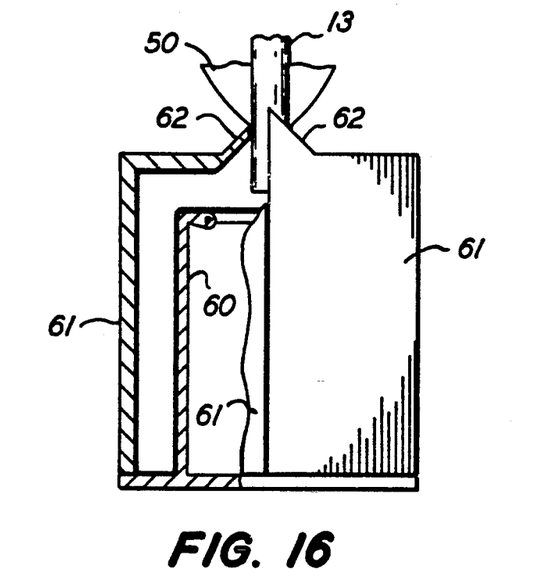
Figure 17:
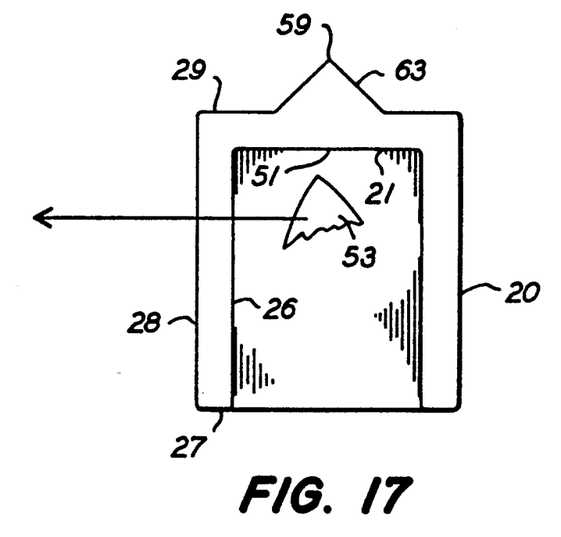

FIGS. 14 and 15 illustrate the raising of core 60 from a level below outer mold parts 61 up to the level of mold parts 61 during the draping process. This allows parison 50 to be lowered down through the space between the outer mold parts to the top of core 60 where it begins to drape over upper regions of core 60, before core 60 raises to the position of FIG. 15. Parison 50 is deballooned as core rises so that the parison is not over inflated as its interior space is reduced by the rising core. Outer mold parts 61 can be closed around the parison while core 60 rises so that the parison is confined within the cavity formed by the closed outer mold parts. It is also possible to raise core 60 into the deballooned parison before closing outer mold parts 61. When core 60 reaches the level of outer mold parts 61, the parison is completely draped over the core and is ready for molding. Surfacing material coated on the inside of parison 50, as previously described, prevents parison surfaces from sticking to each other if they touch at the upper corners of core 60 while the core is rising and the parison is deballooning.

Outer mold parts 61 of FIGS. 14 and 15 have a roof configuration 62 that forms a roof shape 63 at the bottom of the outside wall 29 of box 20. This also pinches off parison 50 at a higher level 59 spaced a little farther from leading pinch-off region 51 on the inside wall 21 at the bottom of box 20. Roof region 63 can form a filling reservoir for filling the interwall space of box 20.

I have found in practice that a parison distance from leading pinch-off region 51 to following pinch-off 59 at roof region 63 can be eight feet long; and throughout this length, the inner and outer walls of the box can be separated by less than two inches. Boxes made according to my invention can be as deep as desirable, within practical limits of managing the draping of a heavy, plasticized parison. Double-walled boxes, blow molded my way, can have walls that are nearly uniform in thickness and perform sturdily and reliably in the finished box. Use of a single parison for blow molding a deep, double-walled box without any seams or unions also simplifies the box-forming process.

I claim:

1. A blow molded double-walled box formed of a single, partially inverted, resin parison, said box having a depth from an open end region to a closed bottom region, said depth being larger than one-half a width of said open end region, and said box comprising:
   a. leading and trailing parison pinch-off regions being formed in said closed bottom region so that one of said pinch-off regions occurs in an inner wall of said box and the other of said pinch-off regions occurs in an outer wall of said box; and
   b. said open end region of said box being formed from an inverted portion of said parison spanning a space between said inner and outer walls of said box.

2. The box of claim 1 wherein said leading pinch-off region occurs in said inner wall of said box.

3. A blow molded double-walled box having inner and outer walls spaced apart throughout the distance from an open end region of said box to a closed bottom region of said box, said box being formed of a single parison that is inverted between said inner and outer walls, and said box having a depth larger than one-half a width of said open end region, said box comprising:
   a. said open end region of said box being formed by an inverted portion of said parison extending in a general U-shape in cross section to span a space between said inner and outer walls; and
   b. leading and trailing parison pinch-off regions being formed in said closed bottom region of said box so that said pinch-off regions confront each other in said inner and outer walls of said box.

4. The box of claim 3 wherein said leading pinch-off region occurs in said inner wall.

5. A deep, double-walled box formed of a single, blow molded resin parison, said box comprising:
   a. a leading parison pinch-off region being arranged in a closed bottom region of said box;
   b. a first wall of said box being formed to extend from said leading parison pinch-off region to an open end region of said box;
   c. a periphery of said open end region of said box being formed to extend from said first wall;
   d. a second wall of said box being formed to extend from said open end periphery generally parallel with said first wall to a trailing parison pinch-off region confronting said leading parison pinch-off region in said bottom region of said box; and
   e. said first and second box walls being spaced from each other.

6. The box of claim 5 wherein said first wall of said box is an inner wall of said box, and said second wall of said box is an outer wall of said box.

* * * * *

UNITED STATES PATENT AND TRADEMARK OFFICE
CERTIFICATE OF CORRECTION

PATENT NO. : 5,063,094

DATED : November 5, 1991

INVENTOR(S) : Richard C. Legge

It is certified that error appears in the above-identified patent and that said Letters Patent is hereby corrected as shown below:

```
     Title page,   Item : [75]                    after Legge
delete "et al."; at Inventors, after Pittsford insert --,--
and delete "; George F. Arp, Fairport, both of".
```

Signed and Sealed this

Sixteenth Day of May, 1995

Attest:

BRUCE LEHMAN

Attesting Officer

Commissioner of Patents and Trademarks